UNITED STATES PATENT OFFICE.

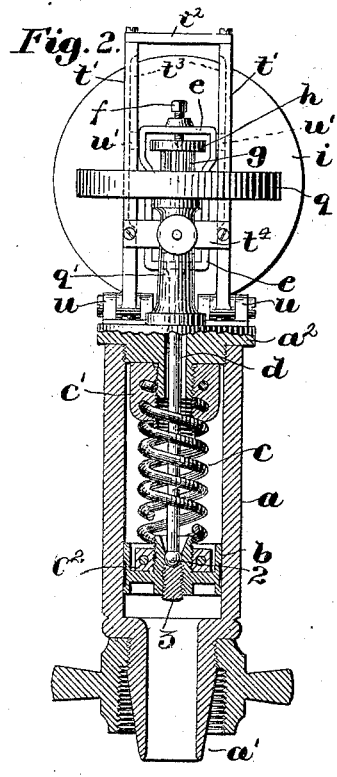

AUGUSTUS F. NAGLE, OF MONTCLAIR, NEW JERSEY, ASSIGNOR TO EARLE H. GOWING, OF READING, MASSACHUSETTS.

STEAM-ENGINE INDICATOR.

SPECIFICATION forming part of Letters Patent No. 695,227, dated March 11, 1902.

Application filed July 6, 1901. Serial No. 67,345. (No model.)

*To all whom it may concern:*

Be it known that I, AUGUSTUS F. NAGLE, of Montclair, in the county of Essex and State of New Jersey, have invented certain new and useful Improvements in Steam-Engine Indicators, of which the following is a specification.

This invention has for its object to provide an efficient, reliable, and durable integrating mechanism for determining continuously the amount of power developed by an engine.

The practice with instruments heretofore commonly used is to take an indicator-diagram at intervals of five, ten, or fifteen minutes and work up the horse-power from the measured area of the diagram. It is a well-known fact that in nearly all steam-engines, and especially in those used for electric power, the work is constantly changing, so that no periodical indications such as are obtained by this means give a correct measurement of the average power.

My invention and improvements relate to continuous measurements instead of intermittent ones, as hereinafter described and claimed.

Of the accompanying drawings, forming a part of this specification, Figure 1 represents a side elevation of an indicator embodying my invention. Fig. 2 represents a section on line 2 2 of Fig. 1. Fig. 3 represents a top plan view. Fig. 4 represents a side elevation, partly in section, the lower portion of the cylinder being broken away.

The same reference characters indicate the same parts in all the figures.

In the drawings, $a$ represents the cylinder of my improved indicator, having at one end a coupling or other suitable means for connection to a pipe or passage communicating with the engine-cylinder.

$b$ is a piston fitting the cylinder $a$ and held normally in the position shown in Fig. 2 by a duplex spring $c$, interposed between the piston and the cylinder-head $a^2$. The upper end portion of the piston-rod $d$ is adapted to oscillate or swing slightly for a purpose hereinafter described. This movement is permitted in the construction shown in Fig. 2 by means of a ball 2, formed on the lower end of the piston-rod and supported by the concave or cupped end of a screw 3, inserted in the bottom of the piston. The central portion of the piston is cupped above the screw 3, the cupped portions of the screw and piston and the ball on the piston-rod forming a movable joint, which permits the oscillation referred to. The ends of the members of the duplex spring $c$ are affixed to nuts $c'$ $c^2$, which are secured, respectively, to the cylinder-head $a^2$ and piston $b$.

The piston-rod $d$ is extended through an opening in the cylinder-head $a^2$, said opening being of sufficient diameter to permit the swinging movement of the rod.

$e$ represents a yoke which is rigidly attached to the outer end of the rod $d$. Said yoke is provided at its upper and lower ends with pivots $f f'$, located in the center line of the rod, which engage and rotatively support an elongated gear or pinion $g$, the pivot $f'$ being formed as an adjustable screw. Attached to or forming a part of the elongated gear $g$ is a friction-wheel $h$, of greater diameter than the gear.

$i$ represents a disk formed on or attached to a shaft or stud $i'$, which is journaled in a bearing $j$, affixed to the cylinder-head $a^2$. The side or face $i^2$ of the disk $i$ is in a plane which is parallel with the direction of movement of the piston and its rod and is frictionally engaged with the friction-wheel $h$, the latter being yieldingly pressed toward the disk $i$ by means presently described. The friction-wheel $h$ and disk $i$ are preferably made of hardened steel.

The disk $i$ is oscillated forward and backward by means of a grooved pulley $m$, affixed to the shaft $i'$ and engaged with a cord connected with the cross-head of the engine, and a spring $n$, Fig. 4, secured at one end to the pulley and at the other to the bearing $j$, the cord acting to rotate the pulley and the disk $i$ in one direction, while the spring rotates the pulley and disk in the opposite direction. A stop-arm $o$, affixed to the cylinder-head, coöperates with a stop-arm $p$, affixed to the pulley $m$, in limiting the movement imparted to the pulley and disk by the spring $n$.

The elongated gear $g$ and friction-wheel $h$ move with the piston $b$, the latter being reciprocated in the cylinder by the alternate action of steam from the engine-cylinder and of the spring $c$, the steam-pressure forcing the piston outwardly against the pressure of the spring. When the steam-pressure is relieved, the spring reacts and forces the piston inwardly. The friction-wheel $h$ is so arranged that when the piston is at the extreme lower end of its movement the point of contact between said friction-wheel and the face $i^2$ of the disk $i$ is a considerable distance above the center of said disk, as shown in Figs. 1 and 4, and when the piston is moved upward by steam-pressure the said point of contact is moved farther away from the center of the disk, the entire movement of the friction-wheel being at one side of the center, thereby preventing injury from the destructive grinding action which might occur if the wheel traveled across the center.

The oscillations of the disk $i$ impart corresponding movements to the friction-wheel $h$ and elongated gear $g$, the amplitude of said movements depending on the distance between the center of the disk and the point where the wheel and disk are in contact, this distance being determined by the strength of the spring $c$ and by the steam-pressure.

The elongated gear $g$ is a member of a train of gears, the other members of said train being mounted on a suitable stand $q'$, attached to the cylinder-head $a^2$ and provided with pointers, placed over dials $s$ on said stand. The length of the elongated gear is sufficient to maintain the engagement with the train of gears at all positions of the piston. The advanced motion imparted to the friction-wheel $h$ and gear $g$ by the disk $i$ is therefore shown by the pointers through the members of the gear-train.

The means hereinbefore alluded to for maintaining an operative frictional contact between the friction-wheel $h$ and disk $i$ (such maintenance being made feasible by the rocking or jointed connection between the piston-rod $d$ and the piston) are as follows: The yoke $e$ is held in rectilinear position by the guides $t'$ $t'$, to which its two sides are suitably fitted. The guides are connected at the top by a cross-piece $t^2$. At the bottom they are pivoted to projecting ears on the cylinder-head, the axis of the pivots being parallel to the plane of the disk, and by this means the guides are adapted to swing in and out toward the face of the disk. The inner sides of the guides $t'$ are provided with longitudinal grooves $t^3$, which receive rollers $u'$ $u'$, mounted on the sides of the yoke $e$, said rollers being adapted to travel in the grooves $t^3$ and by their bearing on the walls of said grooves maintaining an engagement between the yoke and the frame $t$, whereby the yoke is caused to partake of any sidewise movement imparted to the guides. $t^4$ represents a cross-bar attached to the guides $t'$, below the upper end thereof. $v$ represents a spring which is interposed between the cross-bar $t^4$ and a screw-threaded spring-abutment $w$, adjustably engaged with a tapped socket in a stand $q'$ on the cylinder-head, said stand supporting the casing $q$. The force exerted by the spring $v$ presses the guides $t'$, and therefore the friction-wheel $h$, toward the disk $i$, and thus maintains the desired frictional contact between the said wheel and disk. The spring $v$ is supported by a rod $w'$, affixed to the cross-bar $t^4$ and extending through an opening in the abutment $w$, the rod being adapted to slide in the abutment. The outer portion of the rod $w'$ is screw-threaded, and a nut $w^2$ is engaged with the threaded portion of the rod, said nut serving to draw said guides away from the disk when it is desired to temporarily withdraw the friction-wheel $h$ from contact with the disk.

The connection between the piston-rod yoke $e$ and the swinging guides $t'$ afforded by the rollers $u'$ and grooves $t^3$ is relatively antifrictional, and the swinging guides enable a light spring to maintain a suitable frictional connection between the wheel $h$ and disk $i$, so that the wear of said parts is reduced to a minimum.

The operation of the instrument is as follows: The spring $n$ and the motion-reducing mechanism connected with the pulley $m$ and with the cross-head of the engine impart a backward-and-forward motion to the disk $i$, and the steam-pressure acting upon the piston and upon the spring $c$ forces the piston upward and determines the position of the friction-wheel $h$. It does not matter where the exact location of this wheel may be, for the difference between the steam and exhaust pressure is what is recorded—that is, when the steam is admitted the wheel $h$ is moved upward and receives and imparts to the train of gears rotary movements of an extent or amplitude which increases with the upward movement of the friction-wheel $h$, and when the steam is exhausted the friction-wheel $h$ receives and imparts to the train of gears rotary movements of a proportionately smaller amplitude and in the opposite direction. The net advance of the gears is a measure of the average effective pressure exerted by the steam. The dials are arranged to register the number of revolutions made by the friction-wheel $h$.

$y$ represents a ring having a hub $y'$, which is secured by a set-screw $y^2$ to the bearing $j$, the periphery of the ring being concentric with the shaft $i'$ and graduated into divisions of equal length, the graduations being preferably arranged to divide the periphery of the ring into one hundred parts. On the periphery of the ring are two slides or sliding pointers $z$ $z$, which are held in engagement with the ring by ears formed on their edges, as shown in Fig. 4.

The pulley $m$ has a laterally-projecting finger $z'$, which alternately strikes one and the other of said slides as the pulley rotates backward and forward and causes the slides to cooperate with the graduations on the ring $y$ in indicating the amplitude or length of the rotary movements of the pulley, and therefore of the disk $i$. This indication is an element in the calculation of the amount of power indicated.

To determine the horse-power from the instrument, the reading of the dials is taken for any desired period of time and the number of revolutions calculated for one minute. The indicated horse-power of one end of the cylinder is computed by the use of the formula $$\text{I. H. P.} = C \times N,$$

in which $N$ = number of revolutions per minute of disk-wheel $h$, indicated by dials.

$C$ = coefficient, depending on the number of spring, the arc of motion of disk, and size of the engine, which for any given engine and adjustment of instrument is constant.

The coefficient $C$ is determined from the formula $$C = \frac{\text{H. P. constant} \times 1 \text{ lb. m. e. p.} \times 1 \text{ stroke per min.} \times \text{scale of spring}}{\text{Fractional part of disk rotation}}.$$

For example, suppose for a period of five minutes the total number of revolutions of friction-wheel is one hundred and eighty. Then the revolutions per minute $$R = 180 \div 5 = 36.$$

Suppose an engine having twenty-inch cylinder, five-foot stroke, the horse-power constant for one pound mean effective pressure. One stroke per minute is area $$20'' \times 5 \div 33000 = \frac{1570.8}{33000} = .0476.$$

Suppose scale of spring is eighty and the fractional part of disk rotation is seven-tenths. Then $$C = \frac{.0476 \times 80}{.7} = .068 \times 80 = 5.44.$$

Then indicated horse-power developed by one end of cylinder $$\text{I. H. P.} = 5.44 \times 36 = 195.84.$$

The formula $$\text{I. H. P.} = C \times N,$$

given above, is worked out as follows: Let $R$ = number of revolutions of engine-shaft per minute.

$N$ = number of revolutions of friction-wheel of instrument per minute as registered on dials.

$D$ = diameter of friction-wheel, in inches.

$S$ = scale of spring as applied to ordinary indicator.

$E$ = distance piston of indicator moves under pressure, equal to scale of spring.

$T$ = fraction expressing amplitude of disk rotation.

The horse-power developed at one end of the cylinder is represented by the familiar expression $$P \times R \times K,$$

in which $P$ = mean effective pressure in engine-cylinder.

$R$ = number of revolutions of engine-shaft per minute.

$K$ = horse-power constant for one pound mean effective pressure and one stroke per minute.

Now the mean effective pressure $P$, referring to the instrument, is obtained from the formula $$P = \frac{N \times S \times D}{R \times T \times 2E},$$

or when $D = 2E$ $$P = \frac{N \times S}{R \times T}.$$

Consequently I. H. P. (one end of cylinder)

$$= \frac{N \times S}{R \times T} \times R \times K,$$

or $$= \frac{K \times S}{T} \times N = C \times N,$$

as above given.

Having thus explained the nature of my invention and described a way of constructing and using the same, though without attempting to set forth all the forms in which it may be made or all the modes in which it may be used, what I claim, and desire to secure by Letters Patent, is—

1. An integrating-indicator or power-meter comprising a cylinder, a piston therein, a helical spring connecting the same to the cylinder-head, a piston-rod extending from the cylinder, and a yoke affixed to the outer end of the piston-rod and provided with pivots placed in the line of the piston-rod, an elongated gear and a friction-wheel supported by said pivots and a friction-disk adapted to be oscillated and presenting a flat side to said friction-wheel.

2. An integrating-indicator or power-meter, comprising a cylinder, a piston therein, a helical spring connecting the same to the cylinder-head, a piston-rod extending from the cylinder, its upper portion being laterally movable, and an elongated gear and a friction-wheel, both supported by the laterally-movable upper portion of the piston-rod, a friction-disk adapted to be oscillated and presenting a flat side to said friction-wheel, and means for yieldingly pressing the laterally-movable upper portion of the rod and the friction-wheel toward the disk to maintain an operative frictional contact between said wheel and disk.

3. An integrating-indicator, or power-meter, comprising a cylinder, a piston therein, a helical spring connecting the same to the cylinder-head, a piston-rod extending from the cylinder and laterally movable at its upper portion, a yoke affixed to the outer end of the piston-rod, an elongated gear and a friction-wheel supported by said yoke, pivoted guides engaged with said yoke, a friction-disk adapted to be oscillated and presenting a flat side to said friction-wheel, and a spring for yieldingly pressing said pivoted guides toward the disk and thereby maintaining an operative frictional contact between the said friction wheel and disk.

4. An integrating-indicator, or power-meter, comprising a cylinder, a piston therein, a helical spring connecting the same to the cylinder-head, a piston-rod extending from the cylinder and laterally movable at its upper portion, a yoke affixed to the outer end of the piston-rod, an elongated gear and a friction-wheel supported by said yoke, pivoted guides for the yoke, said guides and yoke having antifrictional engaging members such as rollers and grooves, a friction-disk adapted to be oscillated and presenting a flat side to said friction-wheel, and a spring for yieldingly pressing said pivoted guides toward the disk and thereby maintaining an operative frictional contact between the said friction wheel and disk.

5. An integrating-indicator or power-meter, comprising a disk, means for oscillating it, and indicating mechanism operated by the movements of the disk, a cylinder, a spring-propelled piston therein, a helical spring connecting the same to the cylinder-head, a piston-rod connected with said indicating mechanism, a fixed graduated ring concentric with the axis of the disk, and adjustable slides or pointers movable on the graduated periphery of said ring.

In testimony whereof I have affixed my signature in presence of two witnesses.

AUGUSTUS F. NAGLE.

Witnesses:
  B. M. BERRY,
  B. S. PARKER.